United States Patent [19]

Cozzini et al.

[11] Patent Number: 4,960,599

[45] Date of Patent: Oct. 2, 1990

[54] COLD PARTICLE SUSPENSION AND INJECTION PROCESS FOR MEAT

[75] Inventors: Ivo Cozzini, Lincolnwood, Ill.; Matthew Walker, Marietta, Ga.

[73] Assignee: Cozzini, Inc., Chicago, Ill.

[21] Appl. No.: 410,100

[22] Filed: Sep. 20, 1989

[51] Int. Cl.$^5$ .................................................. A23L 1/31
[52] U.S. Cl. .................................. 426/281; 426/246; 426/646; 426/652
[58] Field of Search ............... 426/281, 246, 646, 652

[56] References Cited

U.S. PATENT DOCUMENTS

| | | | |
|---|---|---|---|
| Re. 30,023 | 6/1979 | Hawley et al. | 426/266 |
| 1,129,868 | 3/1915 | Hoy | 426/646 |
| 2,440,168 | 4/1948 | Cross | 426/646 |
| 3,399,063 | 8/1968 | Schwall et al. | 426/281 |
| 3,615,689 | 8/1971 | Malinow et al. | 426/281 |
| 3,835,223 | 9/1974 | Schwall et al. | 426/281 |
| 4,229,458 | 10/1980 | Dreano et al. | 426/652 |
| 4,254,151 | 3/1981 | Townsend | 426/652 |
| 4,402,982 | 9/1983 | von Lersner et al. | 426/281 |
| 4,820,535 | 4/1989 | Gibson | 426/646 |

FOREIGN PATENT DOCUMENTS 893639  2/1972  Canada ................... 426/281

*Primary Examiner*—Donald E. Czaja
*Assistant Examiner*—J. Workman
*Attorney, Agent, or Firm*—Lee, Mann, Smith, McWilliams & Sweeney

[57] ABSTRACT

A process for injecting a cold particle suspension consisting of trim from like meat and a brine solution into relatively warm, raw meat muscle thereby increasing the weight of said untreated meat with no flavor loss.

4 Claims, No Drawings

COLD PARTICLE SUSPENSION AND INJECTION PROCESS FOR MEAT

BACKGROUND OF THE INVENTION

The present invention is directed to a meat injection process for increasing the green weight of the meat, increasing the water value added to the meat and improving the marbling of lean meat. Various processes of this general type are described in the prior art U.S. Pat. Nos. 3,215,534, 3,835,223, 3,989,851, 4,402,987 and RE 30,023. None of these processes discloses the steps of the present process.

SUMMARY OF THE INVENTION

The present invention provides a process for injecting trim suspended in a cold brine solution into warmer meat mass. The process includes first removing the trim from like meat. The trim consists of fat and lean meat. The trim is then frozen and ground by a grinding apparatus and maintained at a temperature of between 18° F. and 24° F. The ground trim is blended with a brine solution which has been cooled to between 16° F. and 20° F. The brine and trim blend is then mixed to form a saturated solution and then milled into a suspension with a temperature of 32° F. or less. The suspension is injected into the meat muscle having a temperature between 38° F. and 48° F.

DETAILED DESCRIPTION OF THE INVENTION

This process may be used on all types of meat, including beef, pork, poultry, lamb and fish. The meat muscle to be treated by the process of the present invention is first prepared in the industry's standard manner, that is, it is deboned and has the trim removed. If trim is unavailable from the meat to be treated, trim from a like meat may be used. Trim for purposes of the present invention includes fat and some muscle tissue. Trim from the original meat muscle, a like meat muscle or reworked, denatured muscle is frozen to approximately 18° F. Trim values generally vary from between 50% lean and 50% fat to 90% lean and 10% fat. The frozen trim is ground by a grinding apparatus to a particle size of between approximately ⅜ of an inch and 1/16 of an inch. The ground trim is kept generally between 18° F. and 24° F. depending on the type of meat into which it is to be injected. For example, in the process of the present invention it has been found that trim from ham should preferably be chilled to between 18° F. and 22° F., trim from poultry should preferably be chilled to between 18° F. and 24° F. and trim from beef chilled to between 18° F. and 20° F.

A solution of brine is cooled to approximately 18° F. Pickle, i.e. seasonings, nitrates, phosphates, binders, etc., may be added to the brine to act as flavor enhancers and meat preservatives. The temperature of the brine and pickle solution may vary slightly depending on the meat into which the solution will be injected. For example, for ham the brine solution is generally cooled to between 18° F. and 20° F., for poultry it is generally cooled to between 16° F. and 18° F. and for beef it is generally cooled to between 18° F. and 20° F.

The ground trim and the brine and pickle solution are blended together in a first hopper at a predetermined ratio, generally 2, 3 or 4 parts of brine by weight to one part of trim. The trim and brine solution are mixed, preferably by hand, until saturation takes place. The blend is then force fed through a mill which is commercially available from Cozzini, Inc. of Chicago, Illinois under the trademark AR-901, and then fed into a second hopper. The blend is then allowed to flow back into the first hopper at the same rate of flow as it was fed into the second hopper. This process is continued until a temperature of about 32° F. is reached, the preferred temperature being 28° F., or until a maximum of two minutes of reduction has occurred. At that point a complete suspension is achieved.

The suspension is then injected under low pressure via hollow needles into the meat muscle of the meat being treated. The temperature of the meat at the time of injection should be between 38° F. and 44° F., but in no case higher than 48° F. Injecting cold suspension (28° F.–32° F.) into relatively warm meat (38° F.–43° F.) permits faster, more even and deeper penetration of the suspension throughout the meat muscle, because the suspension does not block, clot or gel. This means that the tumble or massage time can be greatly reduced. After injection, standard massaging, as open massage, open tumble or vacuum tumble, may be performed to ensure thorough dispersion of the suspension throughout the meat muscle.

The above-described process results in a 3% to 8% increase in green weight of the untreated product with no flavor loss and with the suspension not visible in the inspected meat product.

Thus it has been shown that the present invention provides a process for increasing the green weight of meat via a cold particle suspension of trim and brine solution which is injected into the meat muscle with no flavor loss.

Various aspects of the process of the present invention have been particularly described in the specification herein, however it must be understood that these particular aspects merely illustrate and that the invention is to be given its fullest interpretation within the terms of the appended claims.

What is claimed is:

1. A process for injecting suspended trim into a mass of meat muscle, the steps of the process including:
   (a) removing trim from meat of the same type as the meat to be injected, said trim consisting of fat and lean meat;
   (b) freezing said trim;
   (c) grinding said frozen trim in a grinding apparatus;
   (d) cooling a brine solution to between approximately 16° F. and 20° F.;
   (e) blending said ground frozen trim and said brine solution together at a ratio wherein the amount of brine is at least double the amount of trim by weight and maintaining the temperature of said blend at between approximately 16° F. and 24° F.;
   (f) mixing said trim and brine solution until a saturated solution is achieved;
   (g) milling said saturated solution until a complete suspension is achieved, having a temperature of 32° F. or less; and
   (h) injecting said relatively lower temperature suspension into said relatively higher temperature meat muscle, said meat muscle having a temperature of between approximately 38° F. and 48° F., whereby said injection process increases the weight of said meat with no flavor loss.

2. A process as in claim 1 including the step of adding a pickle solution to the brine solution prior to blending of said trim and brine solution together.

3. A process as in claim 2 in which flavor enhancing ingredients are included in said pickle solution.

4. A process as in claim 1 in which said trim is frozen to approximately 18° F. prior to grinding.

* * * * *